Jan. 31, 1967    W. H. DOUGLASS, SR    3,302,156
ELECTRICAL RESISTOR WITH WELDED TERMINALS
Filed March 20, 1964
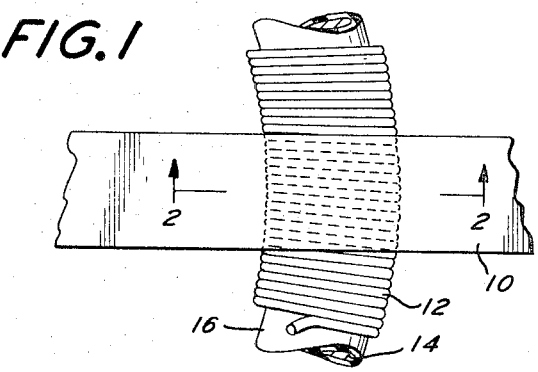
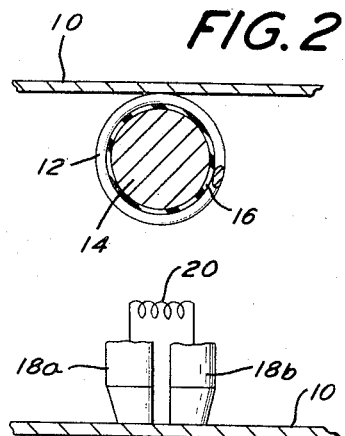
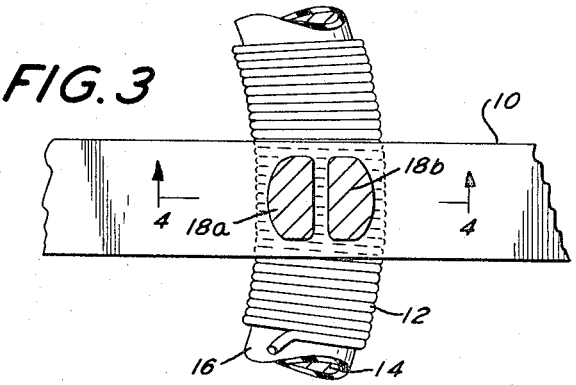
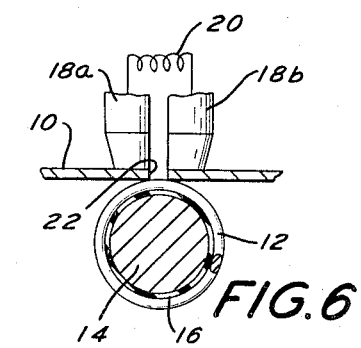
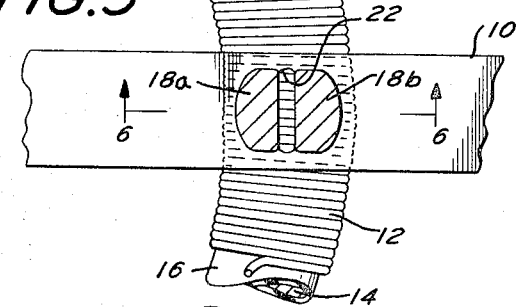
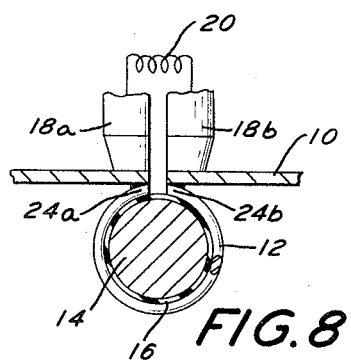
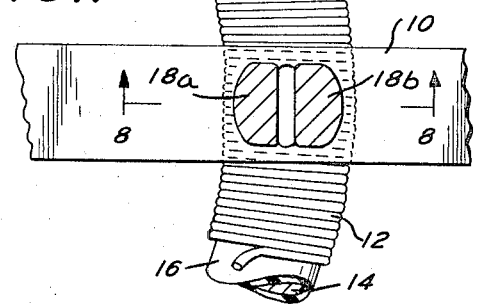
INVENTOR.
WALTER H. DOUGLASS, SR.
BY
ATTORNEY

United States Patent Office 3,302,156
Patented Jan. 31, 1967

3,302,156
ELECTRICAL RESISTOR WITH WELDED TERMINALS
Walter H. Douglass, Sr., Oreland, Pa., assignor to International Resistance Company, Philadelphia, Pa.
Filed Mar. 20, 1964, Ser. No. 353,433
3 Claims. (Cl. 338—329)

The present invention relates to a method of welding a metal strip to fine wires and the article produced thereby. More particularly, the present invention relates to a method of welding a terminating metal strip to a wire wound electrical resistance element.

In general, wire wound electrical resistors comprise a resistance wire helically wound around and along a core of either an electrical insulating material or a conductive material coated with an insulation, and conductive metal terminals secured to the ends of the wire. The resistance wire is often very fine, such as between .010 in. to .0004 in. in diameter, and may be of many alloys both ferrous and non-ferrous. However, the terminals are usually of a much heavier metal of a different material from that of the wire. The terminals must be attached to the wire with a good electrical and mechanical bond. However, because of the composition of the metals of the wire and terminals and the difference in the masses thereof, it has been found to be extremely difficult to form a good bond therebetween by conventional means, such as brazing, soldering or other methods requiring high temperatures and the use of fluxes which may destroy insulations or have a latent corrosive action causing sudden unpredictable failure of the resistor.

A welded junction between the wire and terminal is most desirable, but normally is impossible to obtain using standard welding techniques. The heat and pressure required for welding plus the electrical and thermal differences existing between the fine resistance wires and the terminal materials nearly always prevents successful junction. It is essential to have a thermal and conductive match to create controlled heating to effect a resistance weld. To date the only way which welded junctions, for wire wound electrical resistors have been achieved has been by welding a fine intermediate wire to a single turn of the resistance wire by percussion welding using high voltage without pressure, or by unwrapping a single turn of the resistance wire and welding it to a suitable junction material. The latter method is a tedious operation which is done under a microscope and requires delicate welding means. However, junctions or welds made by these techniques have been found to be quite weak mechanically and have poor electrical characteristics for resistors. Also, these techniques are practically impossible to automate or mechanize so that they must be done by hand labor which is expensive.

It is an object of the present invention to provide a novel method of welding a metal piece to a fine wire.

It is another object of the present invention to provide a novel method of welding a metal piece to one or more turns of a fine wire wound on a core.

It is still another object of the present invention to provide a method of welding a metal terminal to one or more turns of a wire wound resistance element.

It is a further object of the present invention to provide a method of welding a metal piece to a fine wire which provides a good electrical and mechanical bond therebetween, which is relatively independent of the materials of the metal piece and wire, and which can be automated.

It is a still further object of the present invention to provide a novel welded junction between a metal piece and one or more turns of a fine wire wound on a core.

It is yet another object of the present invention to provide a novel welded junction between the terminal and the resistance wire of a wire wound electrical resistor.

Other objects will appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understandng of the nature and objects of the invention, reference should be had to the following detailed description taken in connection with the accompanying drawings in which:

FIGURE 1 is a top plan view illustrating the first step of the method of the present invention.

FIGURE 2 is a sectional view taken along line 2—2 of FIGURE 1.

FIGURE 3 is a top plan view illustrating the second step of the method of the present invention.

FIGURE 4 is a sectional view taken along line 4—4 of FIGURE 3.

FIGURE 5 is a top plan view illustrating the third step of the method of the present invention.

FIGURE 6 is a sectional view taken along line 6—6 of FIGURE 5.

FIGURE 7 is a top plan view illustrating the final step of the method of the present invention.

FIGURE 8 is a sectional view taken along line 8—8 of FIGURE 7.

In general, the welding method of the present invention is based on the use of the heat obtained by the sudden rise in resistance between two closely spaced electrodes when the current between the electrodes is constant and the resistance suddenly rises because of the inability of the conductor between the electrodes to conduct high currents. To achieve this function, a metal piece is placed over the wire to which it is to be welded, and a pair of closely spaced electrodes are placed on the metal piece over the wire. With the electrodes being properly spaced apart, an electrical current passing from one electrode to the other through the metal piece will cause a window or slit to be blown out of the metal piece completely therethrough in the space between the electrodes. With the portion of the metal piece between the electrodes removed, the electrical potential between the electrodes exists through the wire beneath the metal piece. Since the wire is much finer than the metal piece, the wire cannot carry the current and will almost instantaneously burn out. However, the heat from the current which causes the wire to burn out fuses the burnt out ends of the wire to fuse to the metal piece at the edges of the window or slit. Thus, there is provided a welded junction between the wire and the metal piece.

Referring to the drawing, FIGURES 1 and 2 illustrate the first step in the method of the present invention. A flat strip 10 of an electrically conductive metal is placed across and in contact with a plurality of turns of a resistance wire 12 helically wound around a core 14. As shown, the core 14 is of a metal and is coated with a film 16 of an electrical insulating material, such as a varnish or plastic. However, the core 14 itself may be of an electrical insulating material.

As shown in FIGURES 3 and 4, a pair of electrodes 18a and 18b are then placed in closely spaced relation on the metal strip 10 over the turns of the wire 12 which are to be welded to the strip. As shown in FIGURE 3, the opposed surface of the electrodes 18a and 18b are preferably flat and extend transversely across the turns of the wire 12. The electrodes 18a and 18b are connected to a source of electrical current. As shown, the electrodes are connected across the secondary winding 20 of a transformer which is the output of a current source. When the current source is turned on, the current flows from one of the electrodes to the other through the metal strip 10. By properly spacing the electrodes 18a and 18b, the current passing through the portion of the metal strip 10 between the electrodes, causes that portion of the metal strip to quickly heat up and a window or slit 22 (See FIGURES 5 and 6) is blown through the metal strip between the electrodes. As shown in FIGURE 5, the window 22 is of a width equal to the width of the electrodes. With the portion of the metal strip 10 between the electrodes 18a and 18b removed, the electrical potential between the electrodes then exists through the portions of the turns of the wire 12 extending across the window 22. Since the wire 12 is much finer than the metal strip 10, the wire cannot carry the current. Therefore the portions of the turns of the wire 12 extending across the window 22 burn out (See FIGURES 7 and 8). The heat created in the wire 12 which causes the wire to burn out is sufficient to fuse the ends 24a and 24b of the burnt out turns of the wire to the metal strip 10 at the edges of the window 22 (See FIGURE 8). Thus, the metal strip 10 is welded to the wire 12.

To achieve the welded junction of the present invention, the spacing between the electrodes 18a and 18b are relatively critical. The spacing between the electrodes 18a and 18b must be such that the current passing between the electrodes will create sufficient heat to burn out the window 22 in the metal strip 10 quickly enough to prevent the heat from damaging the insulation beneath the wire 12. If the electrodes are spaced too far apart, the time required to heat up the metal strip 10 becomes too great causing damages to the insulation beneath the wire 12. If the electrodes are too close together, the electrodes act as heat sinks drawing heat from the portion of the metal strip between the electrodes. Thus, the time required to heat up the strip to form the window is so great as to cause damage to the insulation. It has been found that to achieve the welded junction of the present invention, the preferred spacing between the electrodes is approximately the thickness of the metal strip 10. With the electrodes properly spaced apart, the current density necessary to achieve the welded juncture of the present invention will vary depending on the thickness of the metal strip. However, the proper current density can be easily determined experimentally.

It has been found that the particular composition of the metal strip 10 and the wire 12 has little, if any effect on the current density necessary to achieve the welded junction of the present invention. For example, using a current of approximately 320 amperes for a time duration of approximately .008 second a nickel ribbon .003 inch thick and .042 inch wide was welded by the method of the present invention to the various wires shown in the following table under an electrode force of 8 to 10 ounces.

RESISTANCE WIRES

| Metal: | Diameter (inch) |
| --- | --- |
| Nickel-chromium alloy | .00075 |
| Nickel-chromium alloy | .00040 |
| Nickel-chromium alloy | .00175 |
| Nickel-chromium alloy | .001 |
| Nickel-chromium alloy | .0013 |
| Copper-Nickel alloy | .00175 |
| Copper-Nickel alloy | .002 |
| Copper-Nickel alloy | .0025 |
| Copper-Nickel alloy | .0045 |

Using the same welding conditions, ribbons of a nickel-chromium alloy, .042 inch wide and varying in thickness from .0005 inch to .003 inch were welded to many of the wires shown in the above table.

The welded junction of the present invention has particular utility in attaching metal terminal strips to the ends of a wire wound resistance element for use in a variable resistor. Such a resistor comprises a wire wound on an elongated core of the type shown in the drawings, and a separate metal terminal strip extending across and welded to a plurality of the turns of the wire at each end of the core. The active portion of the resistance wire winding is the portion of the winding between the adjacent or innermost ends of the windows 22 in the terminal strips. The other turns of the wire, which extend across each of the terminal strips, tightly surround the core and are welded at each end to the terminal strip. Thus, there is provided a strong mechanical connection between the terminal strips and the resistance element. When the resistance element is used in a variable resistor assembly, a movable contact slidably engages the resistance wire winding along a line diametrically opposite the terminal strips so as to obtain various resistance values. When the movable contact reaches the innermost end of the window in the terminal strip, a zero resistance is obtained. The zero resistance is also obtained when the contact engages all of the turns of the wire which are welded to the terminal strip. In most variable resistors, zero resistance is obtained only when the movable contact engages the ends of the resistance wire so that the zero resistance is attainable only by precise positioning of the movable contact. However, with the welded junction of the present invention wherein a zero resistance is provided over a plurality of turns of the wire, a zero resistance setting is easily attainable. Thus, the welded junction of the present invention provides a good electrical and mechanical connection between the terminal strips and the resistance wire winding, and permits ease of obtaining a zero resistance setting.

Although the welding method of the present invention is shown and described for welding a flat metal strip to a wire winding, it can also be used to weld metal pieces of other shapes to the wire winding. For example, the method of the present invention can be used to weld to the wire winding metal caps or bands of the type shown in United States Letters Patent No. 1,763,772 issued June 17, 1930 to J. Geloso, entitled "Resistance" and No. 2,019,457 issued October 29, 1935 to E. G. Lodge entitled "Resistor."

Thus, there is provided by the present invention a method of welding a metal piece to a winding of fine wire without damaging the core on which the wire is wound, and without high electrode pressures which would damage the wire. Also, the method of the present invention requires no special manual handling of the parts being welded so that it can be automated. In addition, the present invention provides a welded junction between a metal piece and one or more turns of a fine wire winding which electrically and mechanically are good and which is an excellent junction for connecting metal terminals to a wire wound resistance element, particularly the resistance element of a variable resistor.

The present invention may be embodied in other specific forms without departing from the spirit or essential attributes thereof and, accordingly, reference should be made to the appended claims, rather than to the foregoing specification as indicating the scope of the invention.

I claim:
1. An electrical resistor comprising a core of electrically insulating material, an electrical resistance wire helically wound around and along said core, a terminal of an electrically conductive metal, one surface of said terminal engaging and extending a cross at least one turn of said wire, said terminal having a slit therethrough which extends longitudinally along said core across said turn of the wire, and said turn of the wire being broken with the broken ends being fused to the edges of the slit in the terminal.

2. An electrical resistor in accordance with claim 1 in which the slit in the terminal extends across a plurality of turns of the wire, and each of said turns of the wire are broken with the broken ends being fused to the edges of the slit.

3. An electrical resistor comprising a core of electrically insulating material, an electrical resistance wire helically wound around and along said core, a separate terminal of an electrically conductive metal at each of the wire winding, a surface of each of said terminals extending across and contacting a plurality of the turns of the wire, each of said terminals having a slit therethrough extending longitudinally along the core across a plurality of turns of the wire, and each of the turns of the wire crossed by said slits being broken with the broken ends being fused to the edges of the slits.

References Cited by the Examiner
UNITED STATES PATENTS

| | | | |
|---|---|---|---|
| 2,675,453 | 4/1954 | Ellin | 338—302 X |
| 2,696,544 | 12/1954 | Poch | 338—302 |
| 2,827,546 | 3/1958 | Fruengel | 219—117 |
| 2,976,509 | 3/1961 | McFaddan | 338—302 X |
| 3,067,319 | 12/1962 | Zamboldi et al. | 219—117 |
| 3,119,919 | 1/1964 | Pratt | 219—384 X |
| 3,227,986 | 1/1966 | Serdahely et al. | 338—302 |

RICHARD M. WOOD, *Primary Examiner.*

V. Y. MAYEWSKY, *Assistant Examiner.*